March 3, 1953     B. W. WOMACK     2,630,123
METHOD FOR REMOVING SPINES FROM CACTI
Filed June 7, 1950

BRYAN W. WOMACK
*INVENTOR*

BY *Herbert J. Brown*

*ATTORNEY*

Patented Mar. 3, 1953

2,630,123

UNITED STATES PATENT OFFICE 2,630,123

METHOD FOR REMOVING SPINES FROM CACTI

Bryan W. Womack, Fort Worth, Tex.

Application June 7, 1950, Serial No. 166,717

4 Claims. (Cl. 130—30)

This invention relates to a method for removing spines from opuntia, commonly known as prickly pear, and from other cacti having similar spine formations.

Although prickly pear plants and the like have been recognized as valuable food for cattle for many years, the spines or thorns on the surfaces of the leaves have made the plants impractical for that purpose. The plants have a high mineral content and are equal to many grasses in food value. Moreover, the plants grow the year around and are not materially affected by freeze or drought, and will grow in parts of the land where the soil is considered nearly worthless.

In order to better understand the invention, it is pointed out that prickly pear plants are comprised of oval shaped leaves joined with and growing out of each other at points around their edges. One leaf usually grows out of the top of another leaf, and such multiple of leaves frequently reach the height of ten or more feet. Each leaf has a relatively tough skin which is covered with a wax like coating, and inside of the leaf there is a pithy fibre having a high water content. The spines covering the leaves are well spaced from each other in groups, and each group has a large or main spine having a cluster of small spines around its base. All spines of each group are in side by side relation, and I found that if the main spine is removed the smaller spines may be readily removed by a rubbing, brushing or wiping action. The fruit or prickly pears grow out of the upper edges of the upper leaves, and may also be processed in accordance with the invention for removing their spines.

The spines are often burned from the leaves and from the pears, but such operation requires careful attention so as to burn the spines without burning the plants. It has also been found that it is almost impossible to burn all of the spines from any one plant since many of the spines are so small that they are difficult to see. Generally, the burning of spines from prickly pear plants is objectionable in that it is costly and is not sufficiently effective so as to prevent injury to the cattle's mouths.

An object of the invention is to provide a mechanical means for removing substantially all of the spines from prickly pear leaves or the like at relatively low cost.

The invention will be more readily understood by reference to the accompanying drawings and the following description.

Figure 1:
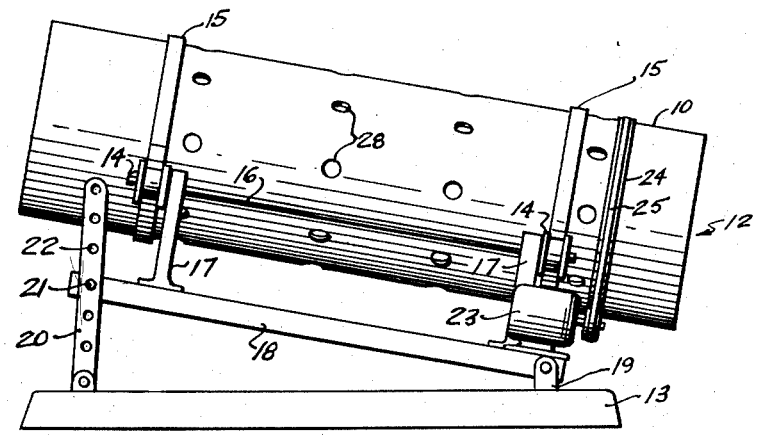
Figure 1 is a side elevation of a preferred form of the invention.
Figure 3:
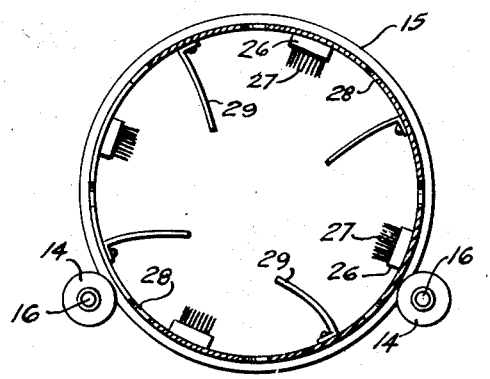
Figures 3 is an enlarged sectional view taken on lines 3—3 of Figure 2.

In Figure 1, the numeral 10 designates a cylindrical tumbler barrel having open ends 11 and 12, respectively, for receiving and discharging the prickly pear plants. The barrel 10 is supported above a rectangular base 13 by means of flanged rollers 14 which receive and rotatably engage rings 15 secured around the barrel 10 and spaced from each end thereof. The rollers 14 are located on opposite sides of the barrel 10 and beneath the latter's axial center, as shown in Figure 3, and are mounted on shafts 16 which are supported by standards 17 mounted on a tiltable bed 18. One end of the bed 18 is pivotally mounted between a pair of brackets 19 projecting upwardly from one end of the base 13, whereas the other end of the bed is vertically adjustable by means of a pair of arms 20 pivotally connected at their lower ends with the base 13 and connected with the bed 18 by means of removable bolts 21. Bolt holes 22 are formed through the pair of arms 20 and whereby the axial center of the barrel 10 may be adjusted to various angles of inclination with respect to the base 13.

The barrel 10 is rotated by means of a motor 23 mounted on the tiltable bed 18 and connected with a drive ring 24 around the barrel by means of an endless belt 25.

Figure 2:
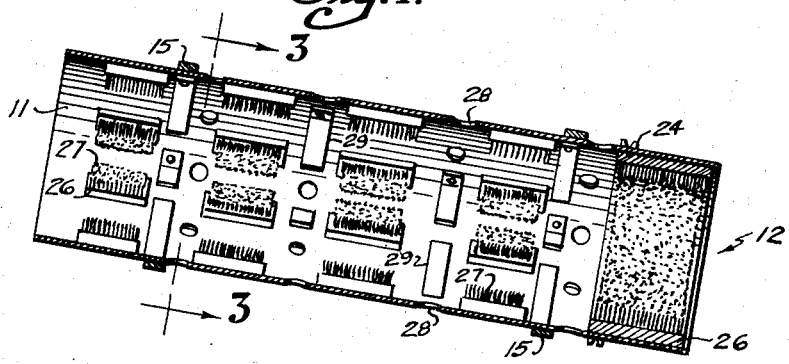
Figure 2 is a longitudinal sectional view of the tumbler barrel illustrated in Figure 1.

Referring now to Figures 2 and 3, the inner surface of the barrel 10 is provided with a multiple of brushes 26 having their bristles 27 directed inwardly. Preferably, the brushes 26 are closer together in the lower or discharge end 12 of the barrel 10 for reasons which will become apparent in the following description of operation. Numerous openings 28 are formed through the wall of the barrel 10 and between the brushes 26 so as to discharge some of the removed spines during the operation of the machine. Inwardly projecting flexible strikers 29 are secured to the inner wall of the barrel 10 to assist in breaking the prickly pear leaves apart.

In operation, either the whole or divided prickly pear plants are placed in the receiving end 11 of the rotating barrel 10 and tumbled, and by reason of the inclination of the barrel the plants are moved toward the discharge end 12. The tumbling of the plants breaks the leaves apart, and which breaking is assisted by the flexible strikers 29. The projecting main spines are bent and fixed during the tumbling operation and their base ends are loosened in the plants. The action of the brushes against the loosened spines causes them to be removed, and the smaller spines are then easily removed by the rubbing and wiping action of the other leaves and by the bristles 27 of the brushes 26. The tumbling of the plants and the resulting rubbing of the leaves upon each other, without the action of the brushes 26, will remove the spines; but such operation takes longer and is not, therefore, as desirable. It will by noted that the groups of spines will be removed not only from the faces of the leaves, but from the edges as well by reason of the tumbling and rubbing action. The initially removed spines fall through the openings 23 in the wall of the barrel 10. As the leaves move toward the discharge end 12 where the brushes 26 are closer together, they are subjected to a more intense wiping action whereby substantially all of the remaining spines are removed.

The present invention is not limited to the specific constructions herein shown and described, but may be made in many ways within the scope of the appended claims.

What is claimed is:

1. The method of removing spines from fresh, free, loose quantities of cacti of the prickly pear type wherein the spines of said cacti are in spaced groups on each unit of cacti and have large spines projecting from the approximate center of each group of smaller spines, to prepare said cacti for cattle feed, comprising the steps of subjecting said cacti to a tumbling action and while tumbling separately beating, wiping, brushing, and rubbing the surfaces of the cacti whereby the leaves of said cacti are broken apart from each other and the large spines are removed by bending, flexing and rubbing the same, and continuing the tumbling, beating, wiping, brushing and rubbing action to remove the smaller spines.

2. The method of removing spines from fresh, free, loose quantities of cacti of the prickly pear type wherein the spines of said cacti are in spaced groups on each unit of cacti and have large spines projecting from the approximate center of each group of smaller spines, to prepare said cacti for cattle feed, comprising the steps of subjecting said cacti to a tumbling action and while tumbling separately agitating, wiping, brushing, and rubbing the surfaces of the cacti whereby the leaves of said cacti are broken apart from each other and the large spines are removed by bending, flexing and rubbing the same, and continuing the tumbling, wiping, brushing and rubbing action to remove the smaller spines.

3. The method of removing spines from fresh, free, loose quantities of cacti of the prickly pear type wherein the spines of said cacti are in spaced groups on each unit of cacti and have large spines projecting from the approximate center of each group of smaller spines, to prepare said cacti for cattle feed, comprising the steps of subjecting said cacti to a rotating tumbling action downwardly along an inclined path and while tumbling agitating the mass, and wiping, and rubbing the surfaces of said cacti whereby the leaves of said cacti are broken apart from each other and the large spines are removed by bending, flexing and rubbing the same, and continuing the tumbling, wiping, and rubbing action to remove the smaller spines.

4. The method of removing spines from fresh, free, loose quantities of cacti of the prickly pear type wherein the spines of said cacti are in spaced groups on each unit of cacti and have large spines projecting from the approximate center of each group of smaller spines, to prepare said cacti for cattle feed, comprising the steps of subjecting said cacti to a rotating tumbling action downwardly along an inclined path and while tumbling agitating the mass, and striking, wiping and rubbing the surfaces of said cacti whereby the leaves of said cacti are broken apart from each other and the large spines are removed by bending, flexing and rubbing the same, and continuing the tumbling, striking, wiping, and rubbing action to remove the smaller spines.

BRYAN W. WOMACK.

REFERENCES CITED

The following references are of record in the file of this patent:

UNITED STATES PATENTS

| Number | Name | Date |
|---|---|---|
| 290,914 | Nicholson | Dec. 25, 1883 |
| 940,260 | Larsen | Nov. 16, 1909 |
| 1,359,148 | Bertrand | Nov. 16, 1920 |
| 1,700,861 | Steinwand | Feb. 5, 1929 |
| 1,702,759 | Barber | Feb. 19, 1929 |
| 2,033,912 | Durand | Mar. 17, 1936 |
| 2,210,584 | Hileman et al. | Aug. 6, 1940 |

FOREIGN PATENTS

| Number | Country | Date |
|---|---|---|
| 198,967 | Germany | June 2, 1908 |

OTHER REFERENCES

"Encyclopedia Americana," 1920 edition, volume 22, page 569, under the heading "Prickly Pear."